Figure 1:
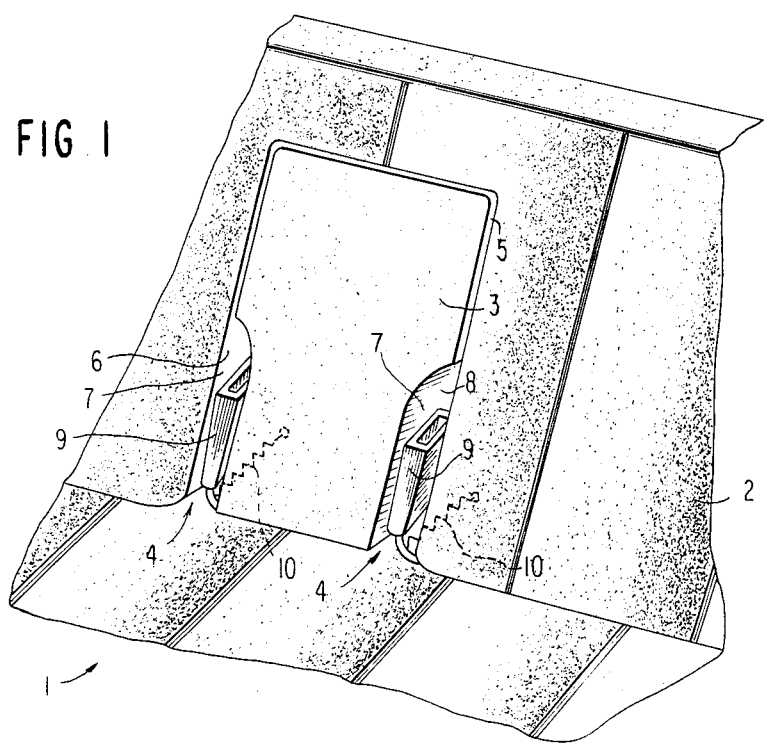

United States Patent [19]

Huber

[11] Patent Number: 4,560,203

[45] Date of Patent: Dec. 24, 1985

[54] INSTALLATION FOR STORING NON-NEEDED BELT LOCK PARTS COORDINATED TO A MOTOR VEHICLE BACK SEAT

[76] Inventor: Guntram Huber, Keplerstrasse 24, 7031 Aidlingen 2, Fed. Rep. of Germany

[21] Appl. No.: 607,590

[22] Filed: May 7, 1984

[30] Foreign Application Priority Data

May 6, 1983 [DE] Fed. Rep. of Germany ....... 3316607

[51] Int. Cl.[4] ...................... B60R 21/60; A47D 15/00
[52] U.S. Cl. .................................. 297/481; 297/113; 297/417; 297/474
[58] Field of Search .............. 297/113, 474, 481, 417; 280/807, 801

[56] References Cited

U.S. PATENT DOCUMENTS

| | | | |
|---|---|---|---|
| 2,278,749 | 4/1942 | Todd | 297/113 |
| 3,219,387 | 11/1965 | Peters | 297/474 |
| 3,840,247 | 10/1974 | Radke | 297/481 |
| 4,118,068 | 8/1978 | Fohl | 297/481 |
| 4,451,087 | 5/1984 | Tamamushi | 280/801 X |

Primary Examiner—James T. McCall
Attorney, Agent, or Firm—Craig & Burns

[57] ABSTRACT

For accommodating belt buckle parts coordinated to a motor vehicle back seat, recesses are provided in a foldable armrest and in particular in the side surfaces thereof. Each recess includes a bottom area constructed as a deflection surface so that when folding out the armrest, the belt buckle parts constructed as belt buckles are deflected laterally and thereby assume a readiness position, in which the coordinated belt buckle latch can be readily inserted. The belt buckle parts are pulled by means of elastic means in the direction toward the bottom area of the recesses so that when the armrest is folded back, the belt buckle parts are again automatically transferred into the recesses.

2 Claims, 2 Drawing Figures

U.S. Patent  Dec. 24, 1985  4,560,203

INSTALLATION FOR STORING NON-NEEDED BELT LOCK PARTS COORDINATED TO A MOTOR VEHICLE BACK SEAT

The present invention relates to an installation for the accommodation of non-needed belt buckle parts coordinated to a motor vehicle back seat having recesses provided in the area of the front side of the backrest.

Such an installation in which the recesses are inset into the backrest cushion, is disclosed in the German Offenlegungsschrift No. 31 28 571. This type of accommodation requires considerable additional expenditure in the manufacture of the backrest since for purposes of obtaining an adequate seating comfort, several recesses spaced from one another have to be provided which always must be very carefully boarded around the edges for achieving a good appearance.

It is an object of the present invention to provide an easily manufacturable accommodation possibility while maintaining a good coordinating possibility of the belt buckle parts to the respective passengers, which does not make necessary any significant additional work during the manufacture of the backrest.

Accordingly, an installation for accommodating non-needed belt buckle parts coordinated to a motor vehicle back seat of the aforementioned type are proposed, whereby according to the present invention, the recesses are accommodated by an armrest adapted to be folded out of the backrest and a recess is arranged at least along each side surface of the armrest which, together with the adjoining backrest wall forms a pocket whose bottom area is constructed as deflection surface so that when pivoting the armrest out of the backrest, the belt buckle parts accommodated thereat are transferred into their use position.

In this manner, the recesses are concentrated over a relatively small part that can be easily handled and the recesses coordinated to the side surfaces of the armrest are completed into a pocket by the adjoining backrest walls which are already present anyhow.

In a preferred embodiment according to the present invention, the belt buckle parts accommodated by the recesses inset into the side surfaces of the armrest, are constructed as belt buckles which are displaced toward the bottom area of the pockets by spring means. Thus, during disengagement of the belt and the subsequent pivoting-back of the armrest, an automatic transfer of the coordinated belt buckle into the stored position takes place.

Figure 2:
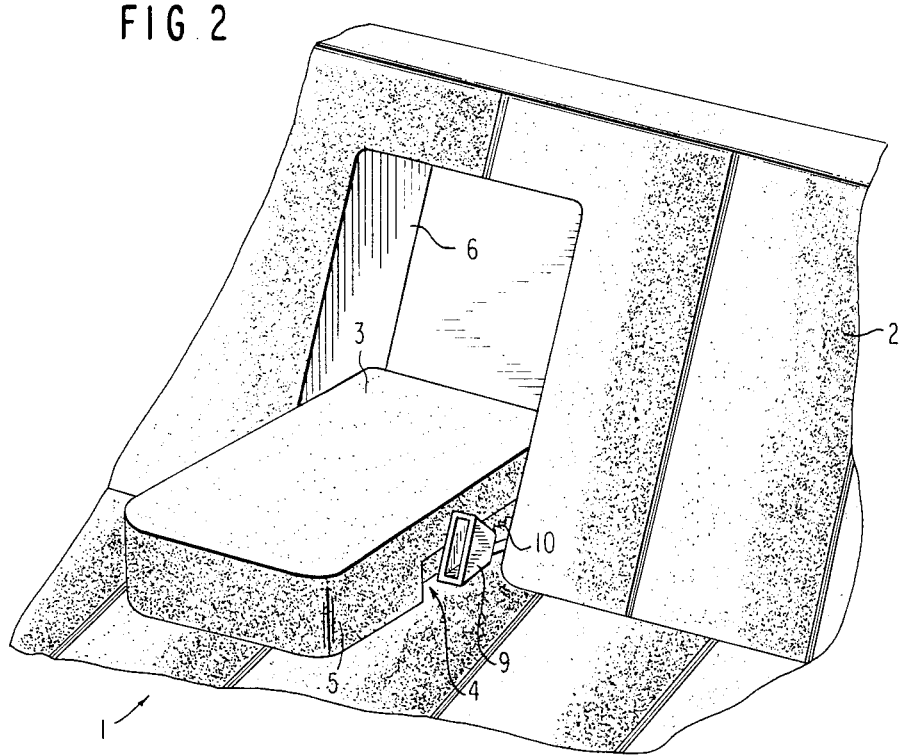

These and other objects, features and advantages of the present invention will become more apparent from the following description when taken in connection with the accompanying drawing which shows, for purposes of illustration only, one embodiment in accordance with the present invention, and wherein:

FIG. 1 is a partial perspective view of an armrest in accordance with the present invention coordinated to a motor vehicle back seat, in the folded-in condition, and receiving laterally two belt buckles in recesses; and FIG. 2 is a partial perspective view of the backrest according to FIG. 1 in the folded-out condition and with belt buckles transferred into readiness position.

Referring now to the drawing wherein like reference numerals are used throughout the two views to designate like parts, a motor vehicle back seat generally designated by reference numeral 1 which is illustrated only schematically, includes a backrest 2; an armrest 3 is adapted to be folded out of the backrest 2. The armrest 3 is provided in the illustrated embodiment with recesses 4, of which one each is arranged at each side surface 5 of the armrest 3. Each recess 4 is completed into a pocket 7 by respectively coordinated backrest wall 6; the bottom area 8 (FIG. 1) of the pocket 7 is constructed as deflection surface.

Each pocket 7 serves for the accommodation of a belt buckle part 9 in the form of a belt buckle, which is drawn toward the bottom area 8 by spring means 10, not illustrated in detail, so that in the folded-in position of the armrest 3 each belt buckle part 9 assumes the position illustrated in FIG. 1.

If the armrest 3 is displaced into the use position illustrated in FIG. 2, then the belt buckle parts 9 are deflected toward the side, due to the bottom areas 8 constructed as deflection surfaces of the recesses 4, and then come to lie adjacent the recesses 4, as can be seen from FIG. 2. In this ready-for-use position, each belt buckle can be readily coupled with the coordinated belt buckle latch (not shown) for the completion of the buckling operation.

When folding-in the armrest 3, the belt buckle part 9, with a removed safety belt, is again pulled into the recess 4 after a small pivot movement of the armrest 3 and then is taken along during the further pivoting movement of the armrest to the folded in, i.e., storage position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for accommodating and storing non-needed seat belt buckle parts coordinated to a motor vehicle back seat provided with recess means in the front side thereof, comprising an armrest operable to be folded out of the backrest, said recess means being provided along side surfaces of said armrest and forming together with adjoining backrest walls pocket means, said pocket means including bottom areas constructed as deflection surfaces that during pivoting of the armrest out of the backrest transfer the belt buckle parts accommodated thereat into their use position.

2. An installation according to claim 1, wherein the belt buckle parts are constructed as belt buckles, and elastic means are provided for biasing the belt buckles toward the bottom areas of the pocket means.

* * * * *